March 15, 1932.　　S. R. TAYMAN　　1,850,055
CENTERING DEVICE
Filed March 5, 1930　　4 Sheets-Sheet 1

INVENTOR
STEWART R. TAYMAN.
BY
Ely & Barrow
ATTORNEYS.

March 15, 1932.  S. R. TAYMAN  1,850,055
CENTERING DEVICE
Filed March 5, 1930    4 Sheets-Sheet 3

INVENTOR
STEWART R. TAYMAN.
BY
Ely & Barrow
ATTORNEYS.

March 15, 1932.　　　S. R. TAYMAN　　　1,850,055
CENTERING DEVICE
Filed March 5, 1930　　　4 Sheets-Sheet 4
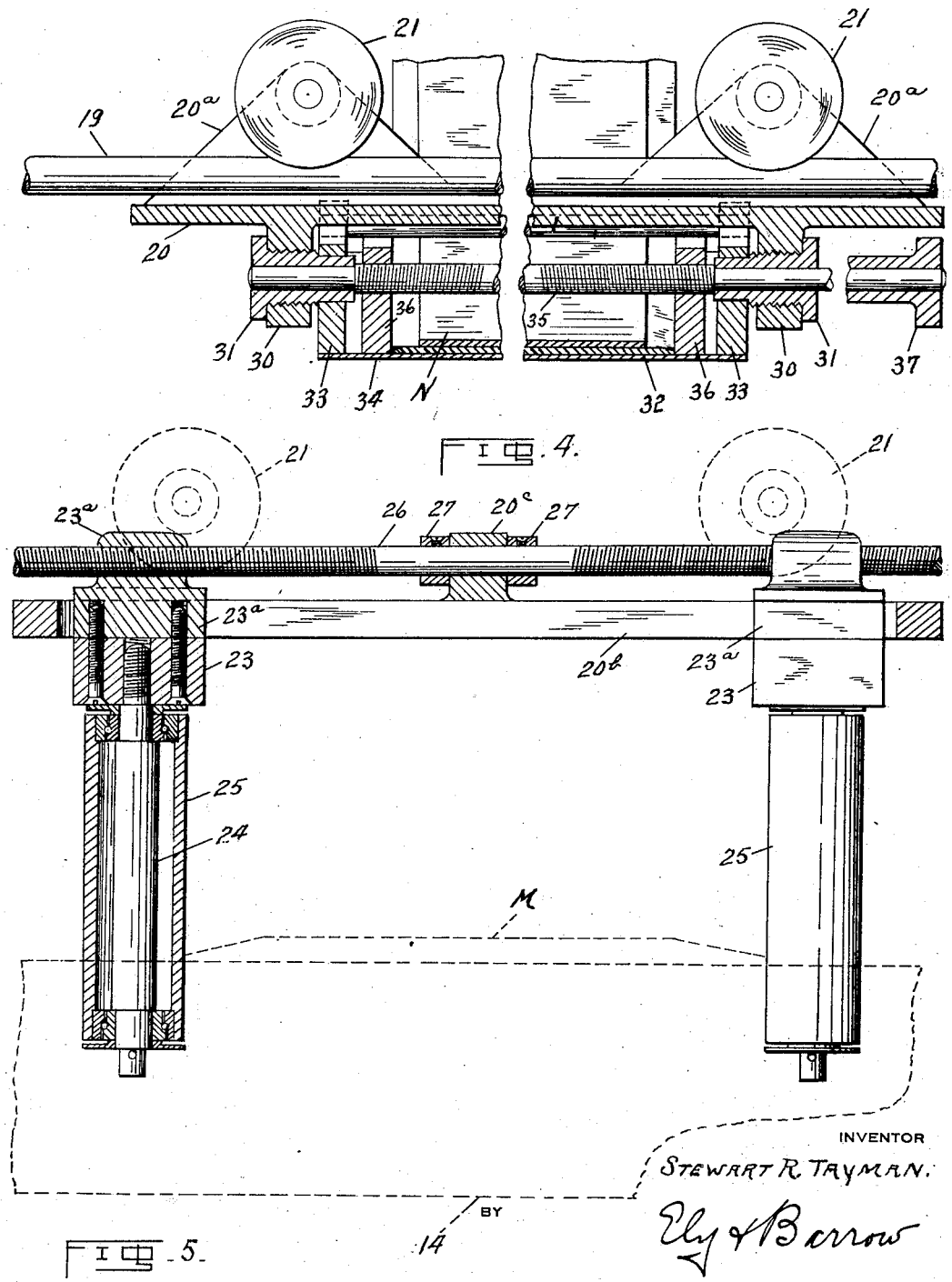

Patented Mar. 15, 1932

1,850,055

UNITED STATES PATENT OFFICE

STEWART R. TAYMAN, OF AKRON, OHIO, ASSIGNOR TO THE FIRESTONE TIRE & RUBBER COMPANY, OF AKRON, OHIO, A CORPORATION OF OHIO

CENTERING DEVICE

Application filed March 5, 1930. Serial No. 433,280.

This invention relates to means for automatically centering a plurality of superimposed, relatively flat materials and more particularly to automatic centering, and joining means for web materials to assist in the construction of pneumatic tires.

It is an object of the invention to provide inexpensive, simple and efficient means for automatically centering and joining a plurality of superimposed relatively flat materials.

The above and other objects of the invention are achieved by the apparatus illustrated in the accompanying drawings and described below, it being understood that the invention is not limited to the exact form thereof shown and described.

In the drawings:

Figure 4 is a transverse sectional view on line 4—4 of Figure 1.

Figure 5 is a transverse section on line 5—5 of Figure 1.

Figure 1:
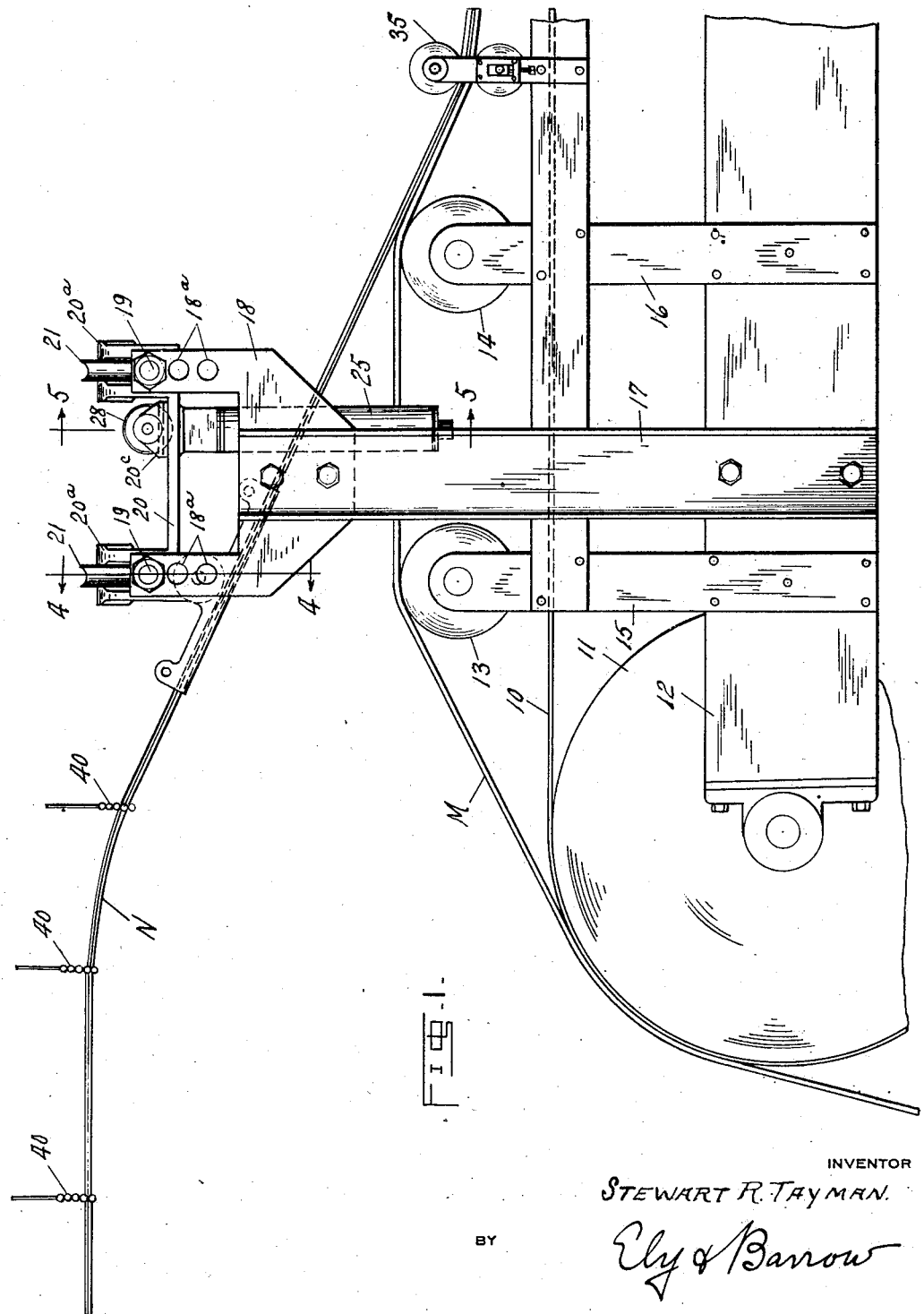
Figure 1 is a side elevation of a centering device embodying the invention.
Figure 2:
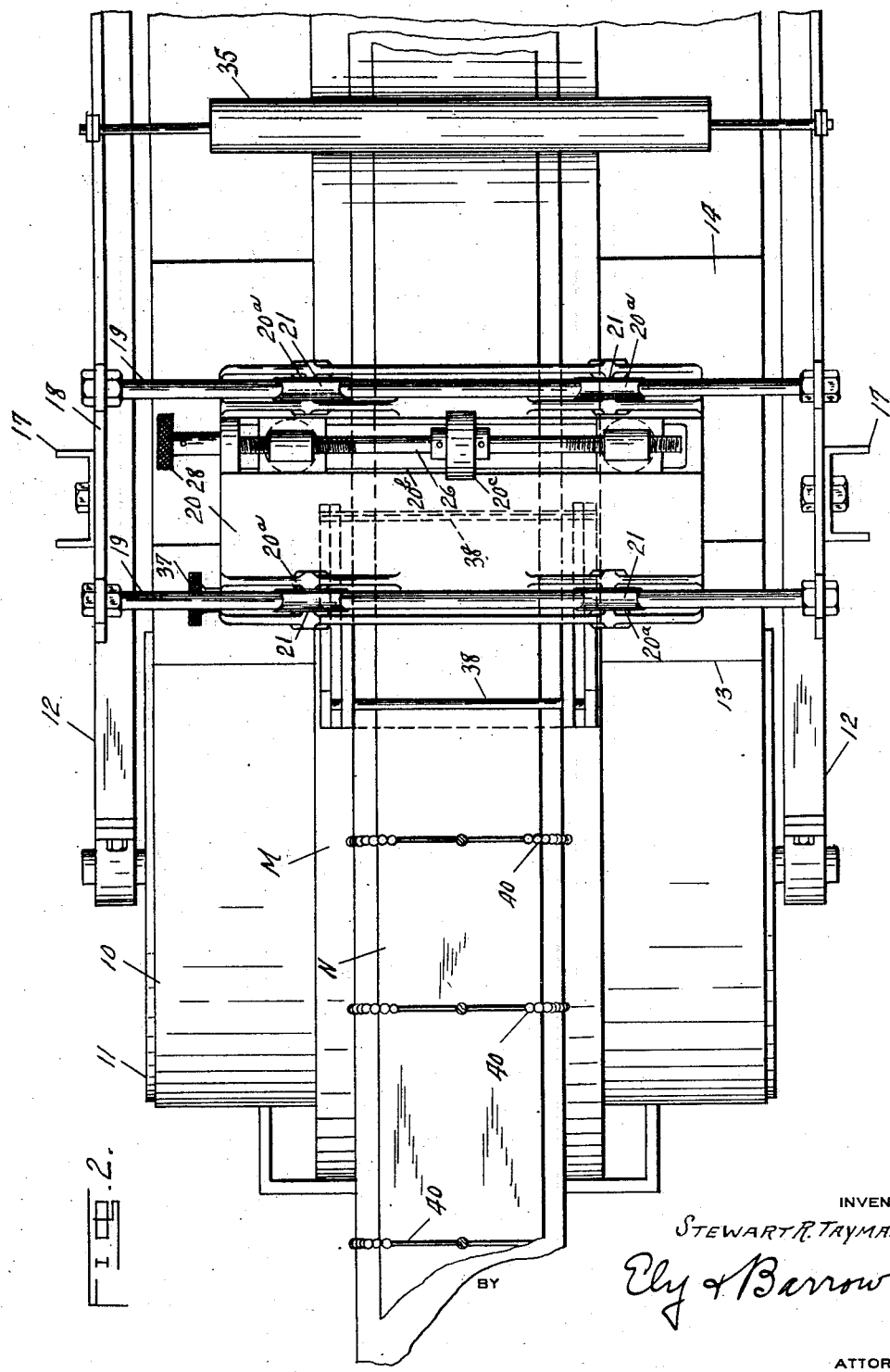
Figure 2 is a plan view thereof.

The numeral 10 indicates a conveyor belt carried on rolls 11 journaled in a suitable frame 12. The conveyor 10 is adapted to carry a relatively heavy, pliable material M which is raised above the surface of the conveyor belt by a pair of spaced rollers 13 and 14 journaled on upstanding arms 15 and 16 fixed to the framework 12.

A pair of channel irons 17 are fixed to the framework 12 between the rollers 13 and 14 and carry U-shaped brackets 18 at their upper ends which are connected by a pair of tie rods or trolleys 19. A plurality of holes 18$^a$ allow the rods 19 to be adjusted to a variety of heights.

Figure 3:
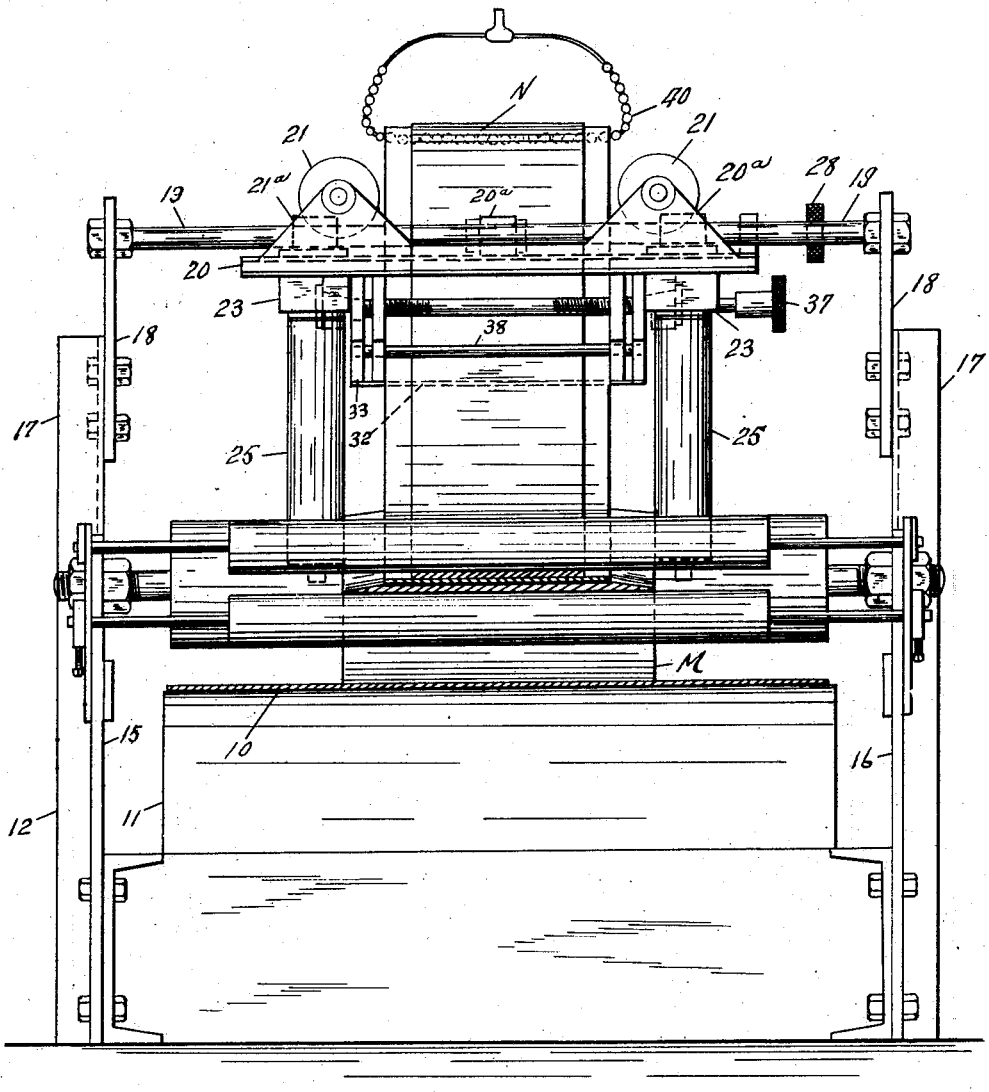
Figure 3 is an end elevation thereof.

The trolleys 19 serve as a support for a carriage 20 of light metal through the agency of wheels 21 which are frictionlessly carried by brackets 20$^a$ of the carriage. The carriage 20 is formed with a slot 20$^b$ and an upstanding lug 20$^c$ bisecting and bridging the slot. The slot 20$^b$ is adapted to slidably support a pair of shouldered split blocks 23 which carry a pair of stub axles 24 upon which are frictionlessly journaled guide rolls 25. The upper half 23$^a$ of each split block 23 is threaded to cooperate with a reversely threaded screw 26 which is journaled in the lug 20$^c$. Collars 27 on the screw allow rotative but not axial movement thereof. Fixed to one end of the screw 26 is a knob 28, whereby the screw may be rotated to adjust the distance between the guide rolls 25. As seen in Figures 3 and 5 the guide rolls 25 are carried at the edges of the material M and serve to keep the carriage 20 centered in respect thereto.

The carriage 20 is formed with a pair of centrally spaced, downwardly extending ears 30 which are tapped to receive inwardly extending bushings 31. The extended portions of the bushings serve to journal a guide trough 32 which may be formed of side members 33 and a bottom plate 34. The bushings also journal a reversely handed screw 35 which controls the position of a pair of guides 36 as will be understood. A knob 37 serves to actuate the screw. A pair of bars 38 may be provided transversely of the trough 32 to slidably support the guides 36.

A second relatively light, flexible material N, shown as a two-ply structure and supported by suitable means, such as bead rollers 40, is brought to the centering device in superimposed relation to the material M.

As illustrated in the drawings the material N passes through the guide trough 32 from which it is carried down into the surface of the material M in centered relation thereto.

A pair of rolls are preferably provided as at 35 to unite the superimposed materials from which rolls the centered, united materials return to the conveyor.

In the operation of the device the materials are generally passed thereto in continuous strips and the conveyor 10 is constantly driven. The distance between the rolls 25 is adjusted by the knob 28 so that the material M just passes freely therebetween. The distance between the guides 36 is next adjusted by the knob 37 so that the material N just passes through the guide trough 32. In this manner in view of the centering of the trough 32 and the guide rolls 25 the material N is centered on the material M as will be evident. Now if the material M moves to one side or the other of the rolls 13 and 14 or the conveyor 10, it carries the light carriage 20 along with it through the agency of the guide rolls 25 so that the centering action of the device is not interrupted and the material N is continuously centered on the material M. The rolls 35 serve to unite the superimposed materials as explained heretofore.

By adjusting the knobs 28 and 37, a plurality of widths of material can be handled. The apparatus is relatively fool-proof and inexpensive and operates efficiently without the attention of an operator.

While the device is adapted to handle strip material of many types including metal and web materials of all sorts, it is primarily designed to center and unite rubberized fabric, tread stock, cushion and breaker strips and the like used in the construction of pneumatic or solid tires.

The invention also contemplates centering and uniting more than two materials either by placing a plurality of devices along the conveyor 10 and bringing in the additional materials at each device or by having a plurality of guiding troughs 32 in superimposed relation.

As many changes could be made in the construction, it is intended that all matter contained in the above description or shown in the accompanying drawings shall be interpreted as illustrative only and not in a limiting sense, accordingly various modifications and applications of the invention can be resorted to without departing from the spirit of the invention or the scope of the appended claims.

What is claimed is:

1. A centering device for a plurality of relatively flat, flexible materials in strip form, comprising a conveyor for carrying one of said strip materials, means for holding the strip material spaced above said conveyor, a carriage, means supporting said carriage above said conveyor and permitting transverse movement of the carriage with respect to the conveyor, a guide trough pivotally carried by said carriage and adapted to receive another of the strip materials, means controlling the width of the guide trough to center the second strip of material therein and thus in the carriage, a pair of downwardly extending guide rolls journaled on the carriage and engaging on opposite sides of the first strip material where it is spaced above the conveyor, and means for varying the distance between said rolls so as to accommodate various widths of materials and to center the carriage with respect to the strip material and thus center the two superimposed strip materials.

2. A centering device for a plurality of relatively flat, flexible materials in strip form, comprising a conveyor for carrying one of said strip materials, a carriage, means supporting said carriage above said conveyor and permitting transverse movement of the carriage with respect to the conveyor, a guide trough carried by said carriage and adapted to receive another of the strip materials, means controlling the width of the guide trough to center the second strip of material therein and thus in the carriage, a pair of downwardly extending guide rolls journaled on the carriage and engaging on opposite sides of the first strip material, and means for varying the distance between said rolls so as to accommodate various widths of materials and to center the carriage with respect to the strip material and thus center the two superimposed strip materials.

3. A centering device for a plurality of relatively flat, flexible materials in strip form, comprising a conveyor for carrying one of said strip materials, means for holding the strip material spaced above said conveyor, a carriage, means supporting said carriage above said conveyor and permitting transverse movement of the carriage with respect to the conveyor, means on said carriage adapted to receive a second strip material and center it with respect thereto, a pair of downwardly extending guide rolls journaled on the carriage and engaging on opposite sides of the first strip material where it is spaced above the conveyor, and means for varying the distance between said rolls so as to accommodate various widths of materials and to center the carriage with respect to the strip material and thus center the two superimposed strip materials.

4. A centering device for a plurality of relatively flat, flexible materials in strip form, comprising a conveyor for carrying one of said strip materials, means for holding the strip material spaced above said conveyor, a carriage, means supporting said carriage above said conveyor and permitting transverse movement of the carriage with respect to the conveyor, a guide trough pivotally carried by said carriage and adapted to receive another of the strip materials, means controlling the width of the guide trough to center the second strip of material therein and thus in the carriage, and means to center the carriage with respect to the first strip material and thus center the two superimposed strip materials.

5. A centering device for a plurality of relatively flat, flexible materials in strip form, comprising a conveyor for carrying one of said strip materials, a carriage, means supporting said carriage relative to said conveyor and permitting transverse movement of the carriage with respect to the conveyor, means on said carriage adapted to receive a second strip material and center it with respect thereto, and means engageable with the first strip material to center the carriage with respect thereto and thus center the two superimposed strip materials.

6. A centering device for a plurality of relatively flat, flexible materials in strip form, comprising a conveyor for carrying one of said strip materials, a carriage, means supporting said carriage relative to said conveyor and permitting transverse movement of the carriage with respect to the conveyor, means on said carriage adapted to receive a second strip material and center it with respect thereto, and means controllable by the position of the first strip material to center the carriage with respect thereto and thus center the two superimposed strip materials.

7. A centering device for a plurality of relatively flat, flexible materials in strip form, comprising a conveyor for carrying one of said strip materials, a carriage, means supporting said carriage above said conveyor and permitting transverse movement of the carriage with respect to the conveyor, means on said carriage adapted to receive a second strip material and center it with respect thereto, and a pair of downwardly extending guide rolls journaled on the carriage and engaging on opposite sides of the first strip material to center the carriage with respect to the strip material and thus center the two superimposed strip materials.

8. In a device for assembling a plurality of flat, flexible bodies in strip form, means carrying said bodies in superimposed relation, a carriage, means supporting said carriage for transverse movement with respect to the bodies, means carried by the carriage, engaging with one of the strip bodies to center the carriage with respect thereto, and means on the carriage to slidably support a second strip body and to center it in relation to the first named body.

9. In a device for assembling a relatively light, flexible web of material in centered relation with respect to a relatively heavy, stiff web of material, a conveyor for carrying said last-named web of material, a movable carriage adapted to be guided by following an edge of said last-named material as said web passes along said conveyor, and means movable with said carriage for guiding said first-named web of material onto said second-named web of material.

10. In a device for assembling a plurality of flat, flexible bodies in strip form, means carrying said bodies in superimposed relation, a carriage, wheels frictionlessly journaled on said carriage, fixed transverse rods cooperating with said wheels for supporting said carriage for transverse movement with respect to the bodies, means carried by the carriage, engaging with one of the strip bodies to center the carriage with respect thereto, and means on the carriage to slidably support a second strip body and to center it in relation to the first-named body.

11. In a device for assembling a plurality of flat, flexible strips in centered relationship, means carrying said bodies in superimposed relation, a carriage, wheels frictionlessly journaled on said carriage, fixed transverse rods cooperating with said wheels for supporting said carriage for transverse movement with respect to the bodies, a pair of centrally spaced guide rolls journaled on said carriage and engaging with one of the strip bodies to center the carriage with respect thereto, and means on the carriage to slidably support a second strip body and to center it in relation to the first-named body.

12. In a device for assembling a plurality of flat, flexible strips in centered relationship, means carrying said bodies in superimposed relation, a carriage, wheels frictionlessly journaled on said carriage, fixed transverse rods cooperating with said wheels for supporting said carriage for transverse movement with respect to the bodies, a pair of centrally spaced guide rolls journaled on said carriage and engaging with one of the strip bodies to center the carriage with respect thereto, means to simultaneously adjust said guide rolls toward or from the center of the carriage, and means on the carriage to slidably support a second strip body and to center it in relation to the first-named body.

13. In a device for assembling a plurality of flat, flexible strips in centered relationship, means carrying said bodies in superimposed relation, a carriage, wheels frictionlessly journaled on said carriage, fixed transverse rods cooperating with said wheels for supporting said carriage for transverse movement with respect to the bodies, a pair of centrally spaced guide rolls journaled on said carriage and engaging with one of the strip bodies to center the carriage with respect thereto, means to simultaneously adjust said guide rolls toward or from the center of the carriage, and a centrally located guide trough pivotally supported on the carriage to slidably support a second strip body and to center it in relation to the first-named body.

14. In a device for assembling a plurality of flat, flexible strips in centered relationship, means carrying said bodies in superimposed relation, a carriage, wheels frictionlessly journaled on said carriage, fixed transverse rods cooperating with said wheels for supporting said carriage for transverse movement with respect to the bodies, a pair of centrally spaced guide rolls journaled on said carriage with respect thereto, means to simultaneously adjust said guide rolls toward or from the center of the carriage, a centrally located guide trough pivotally supported on the carriage to slidably support a second strip body and to center it in relation to the first-named body, a pair of guides forming the sides of said trough, and means to simultaneously move said guides to and from the center line of said carriage.

15. In a centering device, a plurality of flat, flexible bodies in strip form, means carrying said bodies in superimposed relation, a carriage, wheels frictionlessly journaled on said carriage, fixed transverse rods cooperating with said wheels for supporting said carriage for transverse movement with respect to the bodies, a pair of centrally spaced guide rolls journaled on said carriage and engaging with one of the strip bodies to center the carriage with respect thereto, and a centrally located guide trough pivotally supported on the carriage to slidably support a second strip body and to center it in relation to the first named body.

16. In a centering device, a plurality of flat, flexible bodies in strip form, means carrying said bodies in superimposed relation, a carriage, means supporting said carriage for transverse movement with respect to the bodies, a pair of centrally spaced guide rolls journaled on said carriage and engaging with one of the strip bodies to center the carriage with respect thereto, and means on the carriage to slidably support a second strip body and to center it in relation to the first named body.

17. In a centering device, a plurality of flat, flexible bodies in strip form, means carrying said bodies in superimposed relation, a carriage, means supporting said carriage for transverse movement with respect to the bodies, means carried by the carriage, engaging with one of the strip bodies to center the carriage with respect thereto, and a centrally located guide trough pivotally supported on the carriage to slidably support a second strip body and to center it in relation to the first named body.

STEWART R. TAYMAN.